(12) United States Patent
Chenard et al.

(10) Patent No.: US 6,218,471 B1
(45) Date of Patent: *Apr. 17, 2001

(54) ADHESIVE COMPOSITIONS BASED ON ETHYLENE-UNSATURATED ACID ESTER COPOLYMERS AND CONTAINING HYDROXYL FUNCTIONAL GROUPS

(75) Inventors: Jean-Yves Chenard, Pau; Jean Lebez, Evreux; Jean-Michel Pierrot, Grosley sur Risle, all of (FR)

(73) Assignee: Elf Atochem S. A., Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,940

(22) Filed: May 29, 1997

(30) Foreign Application Priority Data

May 29, 1996 (FR) .................................................. 96 06603

(51) Int. Cl.⁷ .................................................. C08G 18/67
(52) U.S. Cl. .............................. 525/123; 528/59; 528/75; 528/81
(58) Field of Search .................................. 528/59, 75, 81; 525/123

(56) References Cited

U.S. PATENT DOCUMENTS

| 3,284,415 | | 11/1966 | Horvath | 525/377 |
|---|---|---|---|---|
| 4,243,705 | * | 1/1981 | Yapp et al. | 427/386 |
| 5,189,096 | | 2/1993 | Boutillier et al. | 525/56 |
| 5,324,778 | | 6/1994 | Boutillier et al. | 525/56 |
| 5,506,296 | * | 4/1996 | Chenard et al. | 525/56 |
| 5,866,656 | * | 2/1999 | Hung et al. | 525/123 |

FOREIGN PATENT DOCUMENTS

| 294271 | 12/1988 | (EP) . |
|---|---|---|
| 380379 | 8/1990 | (EP) . |

OTHER PUBLICATIONS

French Search Report dated Jan. 8, 1997.

* cited by examiner

*Primary Examiner*—Rachel Gorr
(74) *Attorney, Agent, or Firm*—Smith, Gambrell & Russell, LLP

(57) ABSTRACT

The present invention relates to crosslinkable hot-melt adhesive compositions in the form of prepolymer containing free isocyanate functional groups; the said prepolymer results from the reaction of a polyisocyanate and of a copolymer (A) of ethylene and of at least one unsaturated carboxylic acid ester and containing hydroxyl functional groups. These adhesives are crosslinked by the ambient moisture.

12 Claims, No Drawings

ADHESIVE COMPOSITIONS BASED ON ETHYLENE-UNSATURATED ACID ESTER COPOLYMERS AND CONTAINING HYDROXYL FUNCTIONAL GROUPS

FIELD OF THE INVENTION

The present invention relates to adhesive compositions based on ethylene-unsaturated acid ester copolymers and containing hydroxyl functional groups.

It relates more particularly to crosslinkable hot-melt adhesive compositions in the form of prepolymer containing free isocyanate functional groups; the said prepolymer results from the reaction of a polyisocyanate and of a copolymer (A) of ethylene and of at least one unsaturated carboxylic acid ester and containing hydroxyl functional groups.

BACKGROUND OF THE INVENTION

This composition, generally associated with an adhesive (tackifying) resin makes it possible to produce adhesive bondings which resist elevated temperature after crosslinking of the free —NCO functional groups, usually under the effect of atmospheric moisture.

The adhesives are generally in solid form and are applied as a melt phase; they become rigid after application while providing the bonding of the surfaces to be joined. This rigidification usually results from the polymerization or polycondensation of the base components of the adhesive by postcrosslinking. For a number of years attempts have increasingly been made also to introduce adhesive compositions in solid form. In this case these are hot-melt adhesives which have, as base, a thermoplastic resin which is solid at ambient temperature, possessing adhesive properties on postcrosslinking. These adhesives are fluidized when hot, the bonding of the surfaces to be joined being ensured when the adhesive becomes rigid again on cooling. These hot-melt adhesives generally result from the combination of two base constituents: a thermoplastic resin and an adhesive (tackifying) resin, which can be used in combination with additives such as wax, stabilizer, filler, plasticizers and the like. The best-known base thermoplastic resins are polyamides, atactic polypropylene and, in particular, ethylene-vinyl acetate (EVA) copolymers. In the present state these hot-melt adhesives have good adhesive properties but have the disadvantage of exhibiting poor heat resistance, a resistance which barely exceeds 70 to 80° C.

DESCRIPTION OF THE INVENTION

To overcome this disadvantage, a new generation of crosslinkable hot-melt products: crosslinkable polyurethane hot-melt adhesives, has been developed. These products are prepared in a conventional manner by reacting polyisocyanate with polyols of the polyester type, at least one of which is solid at ambient temperature. These adhesives are applied at high temperature as a melt phase. They have the disadvantage of being incompatible with the adhesive (tackifying) resins, and this greatly restricts the formulation possibilities. This is then reflected in a limited bondability to some well-defined substrates. In addition, these products have assembly times of the order of a few minutes, which is too long for some high-output rate applications. The assembly time of a hot-melt adhesive is the time available for performing the bonding, between the instant when the adhesive is applied in the molten state onto the first substrate to be bonded and the instant when the hot-melt adhesive is no longer sufficiently fluid to allow the second substrate to be assembled correctly.

Another type of crosslinkable hot-melt adhesive has been developed from hydroxylated ethylene-vinyl acetate copolymers reacting with a blocked polyisocyanate in stoichiometric quantity, as described in European Patent EP 294 271. These hot-melt adhesives, which are compatible with the adhesive (tackifying) resins, have good adhesive properties but have the disadvantage of requiring subsequent heat treatments at temperatures of at least 120° C. for several minutes to ensure their good crosslinking. Such bonding conditions are not acceptable in the case of some thermally sensitive substrates.

EP 380 379 describes crosslinkable hot-melt adhesive compositions which are in the form of a prepolymer containing free isocyanate functional groups; the said prepolymer results from the reaction of a copolymer of ethylene and of vinyl acetate containing hydroxyl functional groups with a polyisocyanate. This prior art describes the copolymers obtained by direct copolymerization of ethylene, of vinyl acetate and of hydroxyethyl acrylate, as well as the ethylene-vinyl acetate-vinyl alcohol copolymers obtained by partial hydrolysis of ethylene-vinyl acetate copolymers.

The compositions of the present invention have a better strength in the SAPT test and in T peeling than the compositions of the prior art based on ethylene/vinyl acetate/hydroxylated monomer copolymers.

The hydroxyl functional groups of the copolymer (A) can be introduced:

by grafting or by copolymerization of an unsaturated monomer containing at least one hydroxyl functional group, by grafting or by copolymerization of an unsaturated monomer and then reaction of this monomer with a product introducing at least one hydroxyl functional group, by modifying a grafted or copolymerized monomer to create at least one hydroxyl functional group.

The present invention also relates to these copolymers (A).

As an example of an unsaturated carboxylic acid ester forming the base of the copolymer (A) with ethylene there may be mentioned alkyl (meth)acrylates, the alkyls containing from 1 to 24 carbon atoms.

Methyl, ethyl, n-butyl, isobutyl and 2-ethylhexyl (meth)acrylates may be mentioned.

The copolymer (A) may therefore be an ethylene copolymer of an unsaturated carboxylic acid ester and of a grafted or copolymerized monomer chosen, for example, from hydroxyethyl (meth)acrylate or of a carboxylic acid anhydride, allyl alcohol or N-hydroxymethylacrylamide.

The copolymer (A) may also be an ethylene copolymer of an unsaturated carboxylic acid ester and of a carboxylic acid or of a carboxylic acid anhydride (grafted or copolymerized) neutralized with a diol or a polyetherdiol such as ethylene glycol, polyethylene glycol, polypropylene glycol or polytetramethylene glycol.

The copolymer (A) may also be an ethylene copolymer of an unsaturated carboxylic acid ester and of a saturated carboxylic vinyl ester (grafted or copolymerized) which has been hydrolysed.

The copolymer (A) is advantageously chosen from:

copolymers of ethylene, of an alkyl (meth)acrylate and of hydroxyethyl (meth)acrylate, which are obtained by direct polymerization of the three monomers, copolymers of ethylene, of an alkyl (meth)acrylate and of polyethylene glycol (meth)acrylate.

The copolymer (A) advantageously contains, by weight, 40 to 95% of ethylene, 4 to 40% of unsaturated carboxylic acid ester and 1 to 15% of monomer containing at least one hydroxyl functional group. The melt index of the copolymer (A) according to ASTM D 1238-73 is advantageously between 1 and 1000 (g/10 min). The melt viscosity of the copolymer (A) is advantageously between 100 and 10 000 Pa s.

The copolymer (A) preferably contains from $2 \times 10^{-3}$ to $15 \times 10^{-2}$ mol OH per 100 g of copolymer.

This copolymer (A) reacts with a polyisocyanate, preferably a diisocyanate, advantageously aliphatic, cycloaliphatic or aromatic. An excess of polyisocyanate is employed in order that free NCOs should remain.

2,4-Tolylene diisocyanate (TDI), diphenylmethane diisocyanate (MDI), hexamethylene diisocyanate (HMDI) and isophorone diisocyanate (IPDI) may be mentioned among the preferred diisocyanates. MDI is preferably employed.

Free isocyanate functional groups remain in the present compositions. The content of free NCO functional groups is preferably between 1 and 5% by weight of free NCO functional groups, relative to the total weight of the adhesive. This content is preferably from 2 to 3%. This content makes it possible to produce a good compromise between the speed of crosslinking of the adhesive (after bonding) and its stability when hot (before bonding).

The prepolymer is advantageously prepared in the presence of a monoalcohol.

The compositions according to the present invention may additionally contain: (for simplicity they will be called "additives" in the text which follows)
  one or several tackifying resins, in a resin/polymer ratio which can vary from 0 to 3. The preferred tackifying resins are aliphatic or aliphatoaromatic (including natural or synthetic terpene resins) and contain no functional groups which are reactive with isocyanates; the compositions of the invention containing tackifying resins advantageously have a melt viscosity of between 0.1 and 100 Pa s,
  waxes, plasticizers, fillers and stabilizers which are chemically inert towards isocyanates.

The tackifying resins or the weakly hydroxylated waxes can be employed on the condition that hydroxyl functional groups which they introduce are taken into account in the calculation of the total NCO/total OH ratio and that the quantity of simple alcohol employed for reaction with the excess polyisocyanate is lowered in proportion.

These tackifying resins, waxes and plasticizers are employed in a known manner in the hot-melt melt adhesives to modify the viscosity, the assembly time and the adhesiveness.

It is recommended that the compositions of the invention should have a viscosity which is determined, that is to say sufficiently fluid, to permit a rapid setting of bonding at a relatively low temperature in an atmospheric medium with a view to producing an adhesive bonding which can subsequently stand up to a temperature of at least 150° C.

The compositions of the invention contain essentially no free OH functional groups.

The present invention also relates to the preparation of the abovementioned compositions.

The compositions of the invention can be prepared by mixing the various constituents in the molten state.

At the lower mixing temperature, usually between 110 and 130° C., the reaction between the NCOs and the OHs is rapid and takes place in a few hours at most. The prepolymer obtained crosslinks in contact with atmospheric moisture; to be well conserved, it should be stored protected against moisture.

According to an alternative form another subject-matter of the present invention is a process for the preparation of a composition including the following stages:
  (i) melting and drying of the copolymer (A), optionally of the additives;
  (ii) addition and reaction of an alcohol and of the polyisocyanate until the required proportion of NCO is obtained.

Thus, in practice, the procedure may be as follows:
the hot-melt adhesives according to the invention are advantageously manufactured in a single stage according to the following process:
  all the constituents of the formulation, with the exception of the diisocyanate and of the monoalcohol, are premelted at 110–130° C. and dried under reduced pressure in a stirred reactor. The reactor is purged with dry nitrogen;
  the dry monoalcohol and then the diisocyanate are then introduced in suitable proportions and the isocyanate-alcohol reaction is continued at 120–125° C. until the theoretical proportion of NCO is obtained, which requires approximately 4 hours. At the end of the reaction the hot-melt adhesive which is ready for use is recovered by pouring. In the case of aromatic diisocyanates the operation is generally carried out in the absence of catalyst. In the case of less reactive diisocyanates (IPDI) it is possible to use known catalysts for the NCO/OH reaction, such as tin salts (dibutyltin laurate) or amines (diazabicyclooctane).
  the copolymers (A) are prereacted at 110–130° C. with a conventionally employed diisocyanate such as 2,4-tolylene diisocyanate (TDI), diphenylmethane diisocyanate (MDI), hexamethylene diisocyanate (HMDI) or isophorone diisocyanate (IPDI). Because of its lower toxicity, MDI is the preferred diisocyanate of the invention. The terpolymer/diisocyanate reaction is conducted in the presence of a large molar excess of diisocyanate in order to avoid any undesired increase in viscosity.

The excess needed depends on the OH content of the copolymer (A) and on the diisocyanate employed (a diisocyanate in which both NCO functional groups have the same reactivity (MDI) requires a larger molar excess than a diisocyanate in which the two NCO functional groups do not have the same reactivity (TDI)). With a proportion of approximately 2% of hydroxyl monomer, the operation is carried out, for example in the case of MDI, with a total NCO/copolymer (A) OH ratio of approximately 15 to 25. The excess diisocyanate is next neutralized by addition of a single monoalcohol (lauryl alcohol, stearyl alcohol) or of a monoalcohol-dialcohol mixture, such that the final total NCO/total OH ratio is between 1.5 and 2.5 and preferably 1.8 to 2.2.

The viscosity of the adhesives of the invention at their temperature of use (130° C.) is typically from 5 to 10 Pa s. After storage at 130° C. for 4 hours, in contact with the atmosphere, the increase in viscosity of the adhesives of the invention is of the order of the 10%, which allows an industrial use without any problem in existing machines (for example Nordson Meltex).

The present invention thus provides single-component hot-melt adhesives which offer a facility of use, a high storage stability, i.e. several months at 25° C. and several hours at 130–140° C., viscosities in use =10 Pa s, an appropriate assembly time of 5 to 40 s, a high initial cohesion, a creep temperature under load which increases in step with the progress of the crosslinking, and a flexibility of the product after complete crosslinking. The crosslinking takes place between several hours and several days, depending on the temperature and the ambient moisture.

EXAMPLES

The free isocyanate content of the adhesives according to the invention is expressed hereinafter in grams of NCO per 100 g of adhesive. It is determined according to AFNOR standard 52132.

The melt index (MI) is measured at 190° C. under 2.16 kg, according to ASTM standard D 1238-73, and expressed in g/10 min.

In the following examples we consider the following properties to evaluate the compositions of the invention:
measurement of the SAFT (shear adhesion failure temperature) according to ASTM D 4498:
use of aluminium panels of size:
100 mm×25 mm×1 mm of AG3 type.
Define a region of 25 mm×25 mm at the end of a test piece with a marker.
Place four small panels and then four others adjoining in the length direction, which will be used as shims on the platen of the heat press at 150° C. or any other temperature of use.
Pour the molten adhesive onto the parts to be coated with adhesive (aluminium).
Apply four other test pieces in order to obtain adhesive-coated areas of 25 mm×25 mm.
Press for five seconds at 250 daN. Store the test pieces at 23° C. for at least four hours.
Hang a 0.5 kg weight at each end and place the assembly in an oven programmed for a temperature rise of 0.4° C./minute.
On the same day as the bonding, note the temperature at which the weight falls, that is to say the moment when the adhesive bond fails. Take a mean of the four measurements.

T peel test on aluminium according to ASTM standard D 1876-72.
Use of aluminium sheets of size:
100 mm×25 mm and of 120 μm thickness.
Place three sheets on the heat press at 150° C. or any other mixing temperature.
Pour molten adhesive onto the parts to be coated with adhesive. Apply three other sheets on top after having deposited a strip of silicone-treated paper at the end of the test piece to create a leader. Press for thirty seconds at 250 daN. Store at 23° C. for at least four hours. Carry out the T peel test on the tensometer at 250 mm/min. Take the average of the three measurements. We employ a constant-environment chamber (liquid nitrogen circulation) in order to carry out the T peel test at −30° C.

Example 1

The following are introduced into a Brabender mixer controlled at 90° C. and the blades of which rotate at 50 revolutions per minute:
29.2 g of a terpolymer of weight composition:
70% of ethylene
25% of butyl acrylate 5% of hydroxyethyl acrylate.
The melt index of the terpolymer is 10 (measured at 190° C.–2.16 kg according to ASTM standard D-1238). Its melt viscosity is 8000 Pa s.
12.6 g of terpene-phenol resin (Dertophene®)
12.6 g of ethylene/vinyl acetate wax (Wax AC 430®).

When the mixture is homogeneous and its temperature has stabilized at 90° C., 2.8 g of isophorone diisocyanate are introduced. Mixing is maintained for 10 minutes. The preparation of viscosity of approximately 100 Pa s is taken out of the mixer and then employed for producing the adhesive bonding of aluminium test pieces.

The series of test pieces is divided into 4 batches. The 4 batches are to be evaluated according to the SAFT (Shear Adhesion Failure Temperature) shear creep method.

A batch No. 1 of test pieces is stored protected against moisture and then measured on the day following the bonding.

A batch No. 2 of test pieces is kept for 7 days at 70° C. in the presence of saturated water vapour and then measured 24 hours after having been taken out of this accelerated wet aging treatment.

A batch No. 3 of test pieces is measured after having remained 7 days in ambient atmosphere and at ambient temperature.

A batch No. 4 of test pieces is measured after having remained 14 days in ambient atmosphere and at ambient temperature.

For simplicity, the compositions of the invention are denoted by EBA HEA. These compositions are compared with compositions produced in the same way except that the copolymer is based on vinyl acetate in the same proportions (25%); the adhesive compositions obtained are denoted by EVA HEA.

The results are reported in Table 1 which follows:

TABLE 1

|  | SAFT (° C.) | | T peel at −30° C. (N/cm) | |
| --- | --- | --- | --- | --- |
|  | EVA HEA | EBA HEA | EVA HEA | EBA HEA |
| Batch No. 1 | 85 | 95 | 0 | 1 |
| Batch No. 2 | 211 | 220 | 1.5 | 3.5 |
| Batch No. 3 | 138 | 150 | 0.5 | 2 |
| Batch No. 4 | 227 | 240 | 0.7 | 2.5 |

Example 2

The following are introduced into a Brabender mixer controlled at 75° C. and the blades of which rotate at 50 revolutions per minute:
32 g of a terpolymer of weight composition:
7.1% of ethylene
25% of butyl acrylate
3.9% of hydroxyethyl acrylate.
The melt index of the terpolymer is 250, measured in the conditions of Example 1. Its melt viscosity is 1000 Pa s.
16 g of terpene-phenol resin (Dertophene T®).
When the mixture is homogeneous and its temperature has stabilized at 75° C., 3.6 g of isophorone diisocyanate are introduced.

The preparation has a viscosity of approximately 100 Pa s which is employed, as in Example 1, for producing adhesive bonding of aluminium test pieces, the temperature being 60° C.

Comparison is made with compositions produced in the same way except that the 25% of acrylate is replaced with 25% of vinyl acetate. The results are reported in Table 2 which follows.

TABLE 2

|  | SAFT (° C.) | | T peel at −30° C. (N/cm) | |
|---|---|---|---|---|
|  | EVA HEA | EBA HEA | EVA HEA | EBA HEA |
| Conditioning No. 1: Evaluation just after bonding | 71 | 76 | 0 | 2.0 |
| Evaluation after 1 week's accelerated natural or moist aging | 213 | 235 | 0.5 | 3.0 |

Example 3

The following are introduced into a Brabender mixer controlled at 70° C. and the blades of which rotate at 50 revolutions per minute:

15 g of a terpolymer of weight composition:
  8.27% of ethylene
  6.3% of butyl acrylate
  11% of vinyl alcohol.

The melt index of the terpolymer is 160, measured in the conditions of Example 1. Its melt viscosity is 1500 Pa s.

15.6 g of copolymer of the following composition:
  72% of ethylene
  28% of butyl acrylate of melt index 900, sold under the trade mark Lotryl by the applicant.

15.6 g of terpene-phenol resin (Nirez—V 2040 HM from Arizona).

When the mixture is homogeneous and its temperature has stabilized at 70° C., 13 g of isophorone diisocyanate are introduced.

The melt viscosity of the mixture is approximately 100 Pa s. The adhesive bonding of aluminium test pieces is carried out at 70° C. for 1 minute at 1 bar.

Comparison is made with composites produced in the same way except that the 6.3% and the 28% of butyl acrylate are replaced with vinyl acetate. These results are reported in Table 3 which follows.

TABLE 3

|  | SAFT (° C.) | | T peel at −30° C. (N/cm) | |
|---|---|---|---|---|
|  | EVA HEA | EBA HEA | EVA HEA | EBA HEA |
| Evaluation just after adhesive bonding | 67 | 77 | 0 | 2.5 |
| Evaluation after 7 days' accelerated moist aging | 220 | 237 | 0.5 | 3.5 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Crosslinkable hot-melt adhesive compositions in the form of prepolymer comprising free isocyanate functional groups; said prepolymer results from the reaction of:
   (a) a polyisocyanate and
   (b) a copolymer (A) of:
      (i) 40 to 95% by weight ethylene,
      (ii) 4 to 40% by weight at least one unsaturated carboxylic acid ester, and
      (iii) 1 to 15% by weight of a monomer containing hydroxyl functional groups.

2. Compositions according to claim 1, wherein the unsaturated carboxylic acid ester is an alkyl (meth)acrylate and the monomer containing hydroxyl functional groups is polyethylene glycol (meth)acrylate.

3. Compositions according to claim 1, wherein the content of free NCO functional groups is between 1 and 5% by weight.

4. Compositions according to claim 1, further comprising a tackifying resin, according to a resin/polymer weight ratio not exceeding 3.

5. Process for the preparation of a composition according to claim 1, comprising the following stages:
   (i) melting and drying of the copolymer (A), optionally of the additives,
   (ii) addition and reaction of an alcohol and of the polyisocyanate until the required proportion of NCO is obtained.

6. Compositions according to claim 1 wherein said monomer provides from $2 \times 10^{-3}$ to $15 \times 10^{-2}$ mol OH per 100 g of said copolymer (A).

7. Compositions according to claim 1 wherein said monomer is selected from the group consisting of hydroxyethyl (meth)acrylate, hydroxyethyl carboxylic acid anhydride, allyl alcohol and N-hydroxymethylacrylamide.

8. Compositions according to claim 1 wherein said unsaturated carboxylic acid ester is an alkyl (meth)acrylate and the alkyl contains 1 to 24 atoms.

9. Compositions according to claim 1 wherein said unsaturated carboxylic acid ester is selected from the group consisting of methyl, ethyl, n-butyl, isobutyl and 2-ethylhexyl (meth)acrylate.

10. Compositions according to claim 1 further comprising one or more additional additives selected from the group consisting of waxes, plasticizers, fillers and stabilizers which are chemically inert towards isocyanates.

11. Compositions according to claim 1 wherein said unsaturated carboxylic acid ester is butyl acrylate.

12. Crosslinkable hot-melt adhesive compositions in the form of prepolymer comprising free isocyanate functional groups; said prepolymer results from the reaction of:
   (a) a polyisocyanate and
   (b) a copolymer (A) of:
      (i) 40 to 95% by weight ethylene,
      (ii) 4 to 40% by weight at least one unsaturated carboxylic acid ester selected from the group consisting of methyl, ethyl, n-butyl, isobutyl and 2-ethylhexyl (meth)acrylates, and
      (iii) 1 to 15% by weight of a monomer containing hydroxyl functional groups, said monomer being selected from the group consisting of hydroxyethyl (meth)acrylate, carboxylic acid anhydride, allyl alcohol and N-hydroxymethylacrylamide.

* * * * *